UNITED STATES PATENT OFFICE.

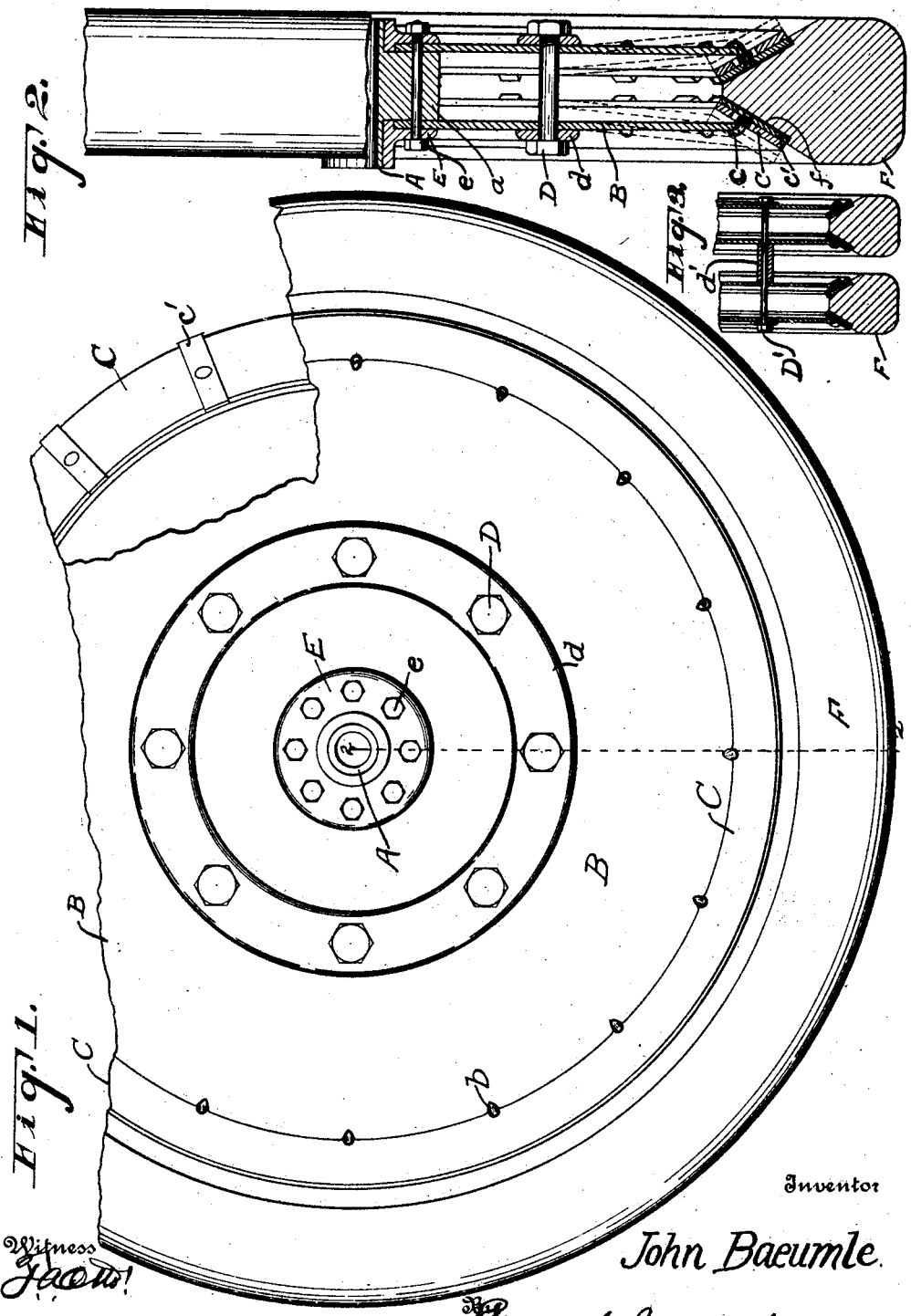

JOHN BAEUMLE, OF MILWAUKEE, WISCONSIN.

RESILIENT TRACTION-WHEEL.

1,391,445.   Specification of Letters Patent.   Patented Sept. 20, 1921.

Application filed August 8, 1919. Serial No. 316,265.

*To all whom it may concern:*

Be it known that I, JOHN BAEUMLE, a citizen of the United States, and a resident of the city of Milwaukee, county of Milwaukee, and State of Wisconsin, have invented certain new and useful Improvements in Resilient Traction-Wheels; and I do declare that the following is a full, clear, and exact description thereof, such as will enable persons skilled in the art to which the invention pertains to make and use the same, reference being had to the drawing hereto attached for disclosure as to certain details of construction.

My invention relates to traction wheels for automobiles, trucks and other vehicles.

The purpose of the invention is the production of a traction wheel which possesses resiliency in such degree that shocks to the vehicle are avoided when passing over uneven roadways, and when obstructions are encountered, and yet which is sufficiently rigid under normal smooth conditions of road travel to support the frame of the vehicle without greater vibration than is ordinarily incident to the use of pneumatic tires.

In carrying out my invention, I use cushion tires in connection with circular steel plates or disks, which latter form the webs of the wheels, and so arrange these parts that the shock caused by the wheel passing over an uneven roadway or striking an obstruction is not transmitted to the vehicle frame, but is absorbed by the lateral flexibility or resiliency of the steel plates.

The arrangement of the parts is such that the movement toward the axis of the wheel of that portion of the tire which is in contact with a roadway, is with a wedging action between the steel disks. The yielding tendency is opposed by the said disks, which are tempered so as to resist separation to such a degree as to not transmit the shock, caused by any unevenness in the roadway, to the frame of the vehicle, and means are provided for adjustment of the resistance of steel disks with relation to the cushion tire which they embrace, so as to adapt the shock absorbing features to the load which the vehicle is designed to carry.

In the drawing herewith,—

Figure 1 is a view in elevation, broken out and in section in parts, showing my improved wheel.

Fig. 2 is a cross sectional view on a radial line extending from the hub to the tire of the wheel, showing the arrangement of the parts, the view being taken on the line 2—2 of Fig. 1.

Fig. 3 is a fragmentary sectional view similar to Fig. 2, but showing the invention as applied to a wheel provided with double tires.

Like parts are identified by the same reference characters throughout the several views.

In the drawings, the hub A of the wheel is provided with an annular ring $a$, with parallel sides intermediate its ends, so as to form a support for the resilient steel plates or disks B. In assembling the wheel, one of the said disks B is placed upon each side of the hub. The ring $a$ and the plates B have registering perforations through which bolts $e$ are passed to unite the parts. Flanged rings E are passed over the ends of the hub A, and are held in position to clamp the elements by means of the said bolts $e$, which likewise pass through corresponding registering holes in the rings E.

The periphery of each disk B is provided with a series of notches $b$ equally spaced, in which notches rest a series of pins $c$, mounted in tapering or conical rings C, the perimeters of which approach in the space between the disks B. The construction thus far described constitutes a wheel with a V-shaped rim, in which is placed a cushion tire F, which will be properly formed to rest with its plane sides in the V formed by the juxtaposition of the two conical rings C. A series of bolts D pass from plate to plate, and serve to resist any tendency of the plates B to separate at the points engaged by the said bolts.

When the wheels encounter rough places or obstructions in the road, the pressure upon the cushion tires F toward the center of the wheel, will be transmitted with a wedging action to the conical rings C. This action will be transmitted to the disks B, which as indicated are of tempered steel, and will therefore resist and limit any tendency to separate. The thrust is therefore taken up by the said steel disks, and the extent of their lateral displacement will be determined by the load carried, and by the condition of the surface of the roadway. The disks B are anchored by the bolts D, which act as fulcrums, permitting the disks to be displaced slightly, as indicated by dotted lines in Fig. 2 of the drawings. The shock resulting from the wheels encountering uneven roadways or obstructions therein, is not transmitted to the vehicle frame, but is absorbed by the resilient disks, with the result that the vehicle frame is not subjected to any greater vibration than which occurs when pneumatic tires are used.

Each of the conical rings C is provided with radial ribs $c'$, which are connected to such conical rings by means of the pins $c$. The purpose of these radial ribs is to prevent the cushion tire from creeping around the wheel, the ribs embedding themselves in the material from which the said cushion tire is formed. To render this action more certain, the cushion tire at the time of formation may be provided with recesses $f$, corresponding in number and extent to the ribs $c'$, which latter enter such depressions.

In Fig. 3, I have shown my invention as applied to a wheel provided with a double tire. The construction of this device is similar to that previously described, excepting that each pair of disks B, receiving a cushion tire F, is spaced by means of a collar $d'$, through which passes a long bolt D to unite and hold the parts in position.

The bolts D provide a means whereby the resistance of the resilient steel disks B may be adjusted when necessary, to meet changing road conditions or loads which the vehicle is adapted to carry.

What I claim and desire to secure by Letters Patent, is:—

1. A wheel for vehicles comprising spaced parallel resilient disks attached to the hub of the wheel, conical rings supported by the disks, a cushion tire resting between such rings, and adjustable intermediate means for holding such disks from lateral separation other than as road pressure upon the tire may flex the disks about such holding means.

2. A wheel for vehicles comprising spaced parallel resilient disks, attached to the hub of the wheel, conical rings supported by the disks, intermediate means for holding the disks from lateral displacement by road pressure, a cushion tire resting between the conical rings, with means on such rings to prevent creeping of the tire.

3. A wheel for vehicles comprising two spaced resilient disks provided with notches in their peripheries, conical rings supported by the disks, and provided with pins which engage the notches in the disks, a cushion tire resting between the said rings, and means for holding the disks against lateral displacement, other than as road pressure upon the tire may flex the disks about such holding means.

In testimony whereof I have signed my name at Milwaukee, this 2nd day of August, 1919.

JOHN BAEUMLE.

Witnesses:
W. F. WOOLARD,
SOPHIE KITZ.